United States Patent Office 2,820,479
Patented Jan. 21, 1958

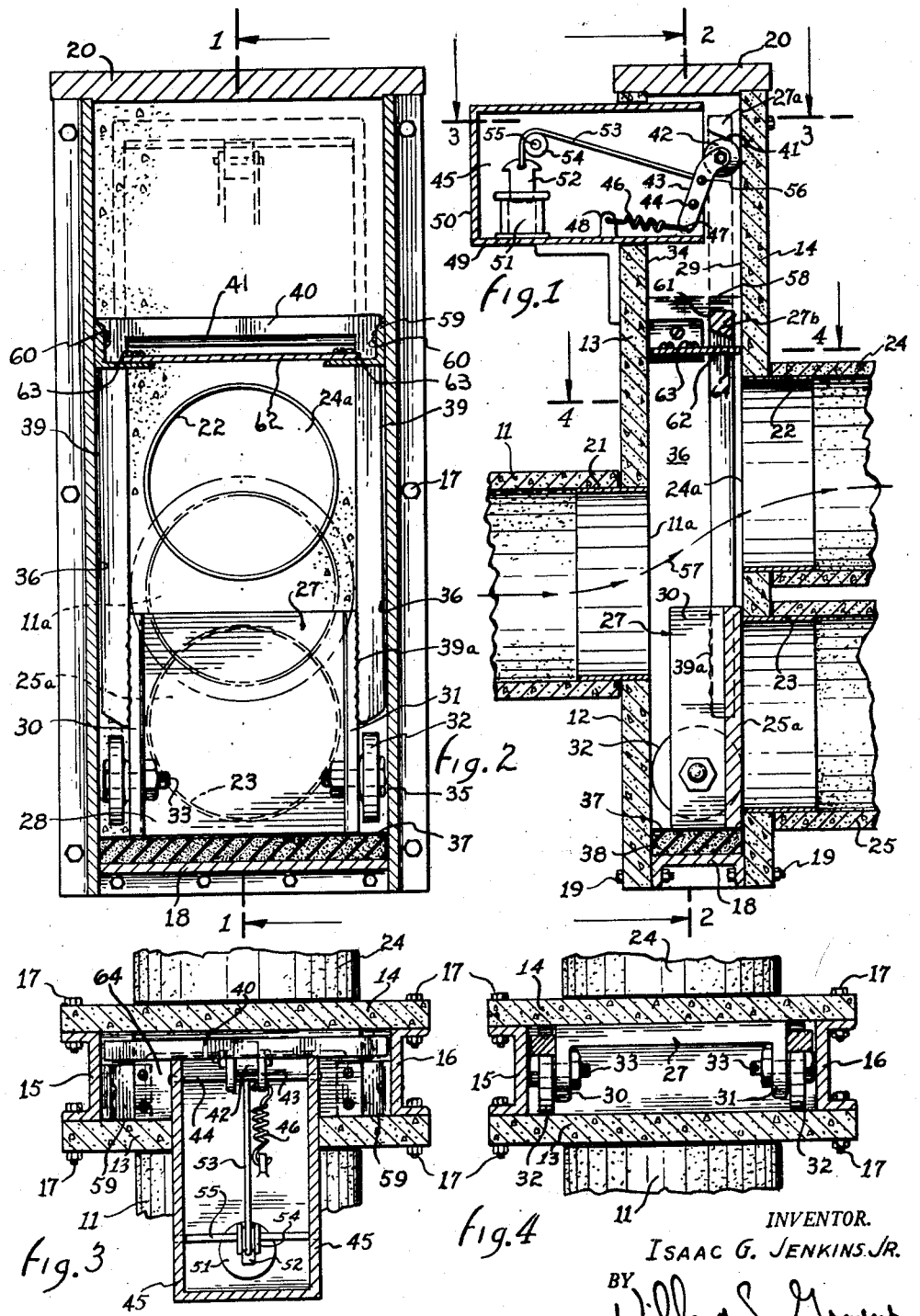

2,820,479
AUTOMATIC IRRIGATION SYSTEM AND APPARATUS

Isaac G. Jenkins, Jr., Phoenix, Ariz.

Application July 12, 1954, Serial No. 442,488

1 Claim. (Cl. 137—625.42)

This invention pertains to improvements in an irrigation system and apparatus, and is particularly directed to such systems and apparatus which function automatically to distribute water to a series of land areas to be irrigated in an automatic sequential manner with a high degree of accuracy of control and supply of water to each area to be treated.

One of the difficulties in connection with irrigating a series of areas in a sequential manner is the care and skill required to manually control the various valves so that there will not be a deficiency in one lot and an excess in another nor will there be over-flooding and waste of the precious irrigation water. Therefore, one of the primary objects of this invention is to provide an improved automatic control system and apparatus functioning independent of operator's skill and care, to sequentially supply the exacting amount of water for each of the respective irrigated areas to be treated.

Another object of this invention is to provide an improved sequentially controlled valve system adapted to be pre-set for a predetermined sequence of water delivery to a series of ground areas which will automatically go through its entire cycle without attention or care upon the part of an operator to properly distribute water in any sequence or to eliminate any desired areas during the operation.

Still another object of this invention is to provide an improved electric control system and valve mechanism for a sequentially functioning irrigation system.

It is a further object of this invention to provide an improved electric and hydraulic control circuit for an irrigation system.

It is also an object of this invention to provide an improved 2-way transfer valve for an improved irrigation system as recited above.

It is a still further object of this invention to provide a specially designed 2-way transfer valve for irrigation systems.

It is also an object of this invention to control a novel 2-way transfer valve for irrigation system by means of precise electrical equipment functioning in response to the depth of water in the respective areas being irrigated.

Further features and advantages of this invention will appear from a detailed description of the drawings in which:

Fig. 1 is an enlarged vertical section through an irrigation transfer valve incorporating the novel features of this invention indicated on the line 1—1 of Fig. 2.

Fig. 2 is a section on the line 2—2 of Fig. 1.

Fig. 3 is a section on the line 3—3 of Fig. 1.

Fig. 4 is a section on the line 4—4 of Fig. 1.

This application is a continuation in part application of my case, Serial No. 388,387, filed October 26, 1953.

A suitable reservoir or water supply is connected through a pipe line 11 to the control valve 12. The valve 12 is preferably constructed as shown in Figs. 1, 2, 3 and 4 and comprises a frame consisting of the side members 13 and 14 which are bolted together with the end channel members 15 and 16 by suitable bolts 17. The bottom is formed by the channel 18 secured to the side members 13 and 14 by suitable bolts 19. A suitable cover plate 20 may be applied to the top portion of the side members 13 and 14 and the end channel members 15 and 16.

An input sleeve 21 is cast integral with the side member 13 which is preferably made of cast cement, and receives the input pipe 11. An upper discharge sleeve 22 and a lower discharge sleeve 23 are cast integral with the side member 14 in a manner similar to the input sleeve 21. Suitable discharge pipes 24 and 25 are suitably connected to the respective sleeves 22 and 23. The sleeve 21 thus forms an input port 11a while the sleeves 22 and 23 respectively form discharge ports 24a and 25a in the chamber formed by the side members 13 and 14 and the end members 15 and 16.

Vertically reciprocatable in the chamber form members 13—14 and 15—16 is the valve gate member 27 comprising the main plate portion 28 which slides in close proximity against the inner surface 29 of the member 14 and has turned up side portions 30 and 31 formed integral therewith. Guide rollers 32 are journaled on suitable studs 33 fixed in the turned up side portions 30 and 31 have diameters just slightly less than the distance between the innerface 29 of the member 14 and the innerface 34 of the side member 13. The side members 39 nicely slide against the inside faces 36 of the end channel members 15 and 16 to provide lateral guiding for the gate 27. A suitable abutment plate 37 resting on top of a suitable cushion material such as sponge rubber 38 provides a soft engagement during the downward travel of the gate 27.

The gate is raised and controlled in its lowering movement by the frame comprising the upwardly extending side members 39 rigidly secured to the side portions 30 and 31 of the gate 27 adjacent the main plate portion 28 thereof. The upper ends of the upwardly extending side members 39 are integrally connected together by the trip bar 40 which has a bevelled underside 41 adapted to be engaged by the trip roller 42 carried on the trip lever 43 pivotally mounted on a pin 44 in the trip actuating housing side plates 45. A tension spring 46 connected pivotally at 47 and to the lug 48 formed integral with the bottom 49 of the trip actuating mechanism box 50 serves to normally swing the roller 42 against the surface 29 of the member 14 under the bevelled abutment surface 41 of the member 40 when the gate is in raised position.

The trip lever 43 may be swung out from underneath the bevelled abutment surface 41 by means of a suitable solenoid 51 secured to the bottom 49 of the trip actuating mechanism box 50 and having its armature 52 connected by a chain 53 passing over an idler pulley 54 journaled on a pin 55 secured in the side plates 45 of the box 50 and connected at 56 to the lever arm 43. The abutment surface 41 on the member 40 is arranged tangent to an arc of swinging movement about the axis of the pin 44 upon which the trip lever 43 is mounted so that no movement in the gate will be affected during the actuation of the lever by the solenoid 51 for easy and quick tripout of the roller 42 to allow the gate to drop from its upper position 27a to its lowered position 27b. When in raised or upper position 27a the gate 27 is so positioned that water is then in communication from the supply line 11 to the output line 25 and when in lowered position as shown in Fig. 1 the water will flow along the line indicated by the arrows 57 from the supply line 11 to the discharge line 24.

It is preferable to provide a baffle to prevent upward splashing of the water which would ordinarily stand at a level 58 in the valve structure, when the gate is instantly dropped by means of energizing the solenoid 51 as described. This baffle construction may comprise a pair of angle members 59 secured by suitable bolts 60 to the end channel members 15 and 16. A baffle plate member 62 is secured by suitable fastening means 63 to the angle members 59 and has an inwardly extending portion 64 nicely fitting between the members 39 to form a baffle to prevent the water from getting up into the trip control box 50.

The valve 12 thus constructed is arranged with its gate in raised position and latched in by the roller 42 as described so that water supply from the line 11 passes through the valve 12 into the line 25 which in turn is connected to the area to be supplied.

Thus, with the automatic system here devised utilizing the trip-operated valve structure described above, it is possible to automatically or remotely irrigate any group of areas. It is to be further noted that a highly efficient electrically controllable valve may be utilized in a plurality of locations in the irrigation system to efficiency and automatically control the flow. Since there is usually an interval of some ten days or two weeks between irrigation periods it is easy for the respective property owners or an irrigation attendant to reset the valve for the lots wanting water to begin another irrigation sequence.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim is intended to be included herein.

Having thus fully set forth and described this invention what is claimed and desired to be obtained by United States Letters Patent is:

In an automatic irrigation system, a trip gate valve comprising, a pair of spaced side members, a pair of spaced end members secured to said side members, a bottom secured to said side and end members, an input supply line including an input port located intermediate the top and bottom of one of said side members, a pair of discharge lines vertically positioned one above the other including discharge ports in the other of said side members equally vertically spaced one above and one below the axis of said input port, a valve gate having a plate portion vertically sliding adjacent the inner surface of said other side members to alternately close one or the other of said discharge ports, turned up side portions formed on the edges of said plate portions extending at right angles thereto and slidingly engaging the inner faces of said end members, rollers journaled on horizontal axes on said turned up portions having diameters slightly less than the spacing between the inner surfaces of said side members and adapted to roll against said inner surfaces of said side members each side of said ports upon the vertical movement of said gate, a horizontal trip bar fixed to the upper end of said gate having a downwardly facing trip abutment surface, a trip lever mounted on one of said side frame members including a trip roller engaging said trip abutment surface, and means for yieldingly holding said lever in a position of engagement of said roller with said trip abutment surface, said lever being actuable to withdraw said roller from under said trip abutment surface to allow said gate to drop from a position of closure of said upper discharge port to a position of closure of said lower discharge port, said trip bar serving as the manual lifting handle to raise said gate to relatched position behind said trip lever roller.

References Cited in the file of this patent

UNITED STATES PATENTS

| | | |
|---|---|---|
| 240,564 | Ware | Apr. 26, 1881 |
| 825,064 | Levey | July 3, 1906 |
| 1,578,429 | Grindle | Mar. 30, 1926 |
| 1,607,343 | Davenport | Nov. 16, 1926 |
| 1,786,878 | Van Keuren | Dec. 30, 1930 |
| 1,825,815 | Nye | Oct. 6, 1931 |
| 1,868,147 | Kruse | July 19, 1932 |
| 1,963,684 | Shimer | June 19, 1934 |
| 2,055,512 | Wallace | Sept. 29, 1936 |
| 2,141,847 | Tennant | Dec. 27, 1938 |
| 2,265,176 | Kinzie | Dec. 9, 1941 |
| 2,505,413 | Lee | Apr. 25, 1950 |